United States Patent
Ushio et al.

(10) Patent No.: US 9,878,734 B2
(45) Date of Patent: Jan. 30, 2018

(54) ELECTRIC POWER STEERING APPARATUS

(71) Applicant: Mitsubishi Electric Corporation, Tokyo (JP)

(72) Inventors: Kohei Ushio, Tokyo (JP); Yoshihito Asao, Tokyo (JP); Satoru Akutsu, Tokyo (JP); Akihiko Mori, Tokyo (JP)

(73) Assignee: Mitsubishi Electric Corporation, Chiyoda-ku, Toyota (JP)

( * ) Notice: Subject to any disclaimer, the term of this patent is extended or adjusted under 35 U.S.C. 154(b) by 74 days.

(21) Appl. No.: 14/768,234

(22) PCT Filed: Sep. 19, 2013

(86) PCT No.: PCT/JP2013/075285
§ 371 (c)(1),
(2) Date: Aug. 17, 2015

(87) PCT Pub. No.: WO2015/001684
PCT Pub. Date: Jan. 8, 2015

(65) Prior Publication Data
US 2015/0375775 A1      Dec. 31, 2015

(30) Foreign Application Priority Data

Jul. 3, 2013    (JP) ................... 2013-139515

(51) Int. Cl.
*B62D 5/04*    (2006.01)

(52) U.S. Cl.
CPC ......... *B62D 5/0406* (2013.01); *B62D 5/0403* (2013.01); *B62D 5/0409* (2013.01)

(58) Field of Classification Search
CPC ... B62D 5/0406; B62D 5/0403; B62D 5/0409
USPC .......................................... 180/444
See application file for complete search history.

(56) References Cited

U.S. PATENT DOCUMENTS

| | | | |
|---|---|---|---|
| 6,132,186 | A | 10/2000 | Cooper et al. |
| 6,347,929 | B1 | 2/2002 | Cooper et al. |
| 2002/0060105 | A1 | 5/2002 | Tominaga et al. |
| 2002/0081221 | A1 | 6/2002 | Cooper et al. |
| 2002/0150486 | A1 | 10/2002 | Cooper et al. |
| 2009/0183940 | A1 | 7/2009 | Sekine et al. |

(Continued)

FOREIGN PATENT DOCUMENTS

| | | |
|---|---|---|
| EP | 2006185 A2 | 12/2008 |
| EP | 2017160 A1 | 1/2009 |

(Continued)

OTHER PUBLICATIONS

Communication dated Oct. 4, 2016 from the Japanese Patent Office in counterpart application No. 2015-525006.

(Continued)

*Primary Examiner* — Tony Winner (74) *Attorney, Agent, or Firm* — Sughrue Mion, PLLC; Richard C. Turner (57) ABSTRACT

An electric power steering apparatus according to the present invention is characterized in that a motor frame (20), a housing (25) and a plate (21) are integrally formed in such a way as to be concentric with an output axle (28) of a motor (11) and in that at least one of the motor frame (20), the housing (25), and the plate (21) is formed of magnesium or magnesium alloy.

6 Claims, 7 Drawing Sheets

(56) References Cited

U.S. PATENT DOCUMENTS

| | | |
|---|---|---|
| 2009/0251030 A1 | 10/2009 | Fujimoto et al. |
| 2009/0272599 A1 | 11/2009 | Sekine et al. |
| 2009/0295325 A1 | 12/2009 | Sekine et al. |
| 2010/0148603 A1 | 6/2010 | Jiang |
| 2010/0320026 A1 | 12/2010 | Yoshida et al. |
| 2012/0094146 A1* | 4/2012 | Hardy .................. B22D 11/008 428/649 |
| 2012/0160596 A1 | 6/2012 | Yamasaki |
| 2012/0273292 A1 | 11/2012 | Sekine et al. |
| 2012/0313467 A1* | 12/2012 | Omae .................. B62D 5/0406 310/71 |
| 2013/0257337 A1 | 10/2013 | Ochiai et al. |
| 2013/0299269 A1 | 11/2013 | Tsunoda |

FOREIGN PATENT DOCUMENTS

| | | |
|---|---|---|
| EP | 2050654 A1 | 4/2009 |
| EP | 2147846 A1 | 1/2010 |
| EP | 2351682 A1 | 8/2011 |
| EP | 2481654 A1 | 8/2012 |
| EP | 2574521 A1 | 4/2013 |
| JP | 10-243605 A | 9/1998 |
| JP | 2001-512957 A | 8/2001 |
| JP | 3774624 B2 | 5/2006 |
| JP | 2007-335735 A | 12/2007 |
| JP | 2008-285142 A | 11/2008 |
| JP | 2009-254141 A | 10/2009 |
| JP | 2010-089739 A | 4/2010 |
| JP | 2011-239574 A | 11/2011 |
| JP | 2012-143036 A | 7/2012 |
| JP | 2012-197051 A | 10/2012 |
| WO | 2009/101794 A1 | 8/2009 |

OTHER PUBLICATIONS

Communication, dated May 24, 2016, from the Japanese Patent Office in counterpart Japanese application No. 2015-525006.
International Search Report of PCT/JP2013/075285 dated Nov. 26, 2013 [PCT/ISA/210].
Communication dated Jan. 31, 2017, from the European Patent Office in counterpart European Application No. 13888588.4.
Communication dated Nov. 28, 2016, issued by the State Intellectual Property Office of the P.R.C. in corresponding Chinese Application No. 201380077877.4.
Communication dated Jul. 4, 2017 from the State Intellectual Property Office of the P.R.C. in counterpart Application No. 201380077877.4.

* cited by examiner

ELECTRIC POWER STEERING APPARATUS

TECHNICAL FIELD

The present invention relates to improvement of an electric power steering apparatus that provides assist force to the steering system of a vehicle by use of, for example, the torque of a motor; the present invention is to raise the strength and the vibration resistance of the electric power steering apparatus, to enlarge the mounting area for a control circuit, and to reduce the weight and the cost of the electric power steering apparatus.

BACKGROUND ART

To date, there has been known an electric power steering apparatus that adds assist force to steering power in order to make a driver comfortably perform steering; the electric power steering apparatus is provided with a motor and a control apparatus for controlling the motor. When due to increase in the output, the motor is upsized, it is required to raise the strength and the vibration resistance of the system while securing the heat radiation performance; in addition, due to increase in the function, the number of electronic components increases; thus, it is also required to enlarge the mounting area for a control circuit. Moreover, for the purpose of achieving improvement of the gasoline mileage of a vehicle, taking an environmental issue into consideration, it is strongly required to downsize the system; Patent Documents 1 and 2 disclose structural technologies for coping with these issues.

PRIOR ART REFERENCE

Patent Document

[Patent Document 1] Japanese Patent No. 3774624
[Patent Document 2] Japanese Patent Application Laid-Open No. 2012-143036

DISCLOSURE OF THE INVENTION

Problems to be Solved by the Invention

However, in the structure disclosed in Patent Document 1, because by use of a plurality of supporting members, the housing is mounted on the heat sink at the outside of the resin circuit case, supporting cannot be implemented by any other members than the plurality of supporting members; therefore, because the coupling strength between the speed reducing mechanism and the motor is reduced, there has been a problem that vibration in the speed reducing mechanism is transferred to the motor and hence the strength of the motor frame or the like is liable to be reduced.

Moreover, because the motor is coupled with the heat sink only by use of the supporting members for the housing, heat generated in the motor cannot effectively be transferred to the housing and hence the supporting member needs to be enlarged; therefore, because the weight of the housing increases and hence the area for the circuit case becomes smaller, there has been a problem that the control circuit board becomes smaller and hence the area for components to be mounted becomes smaller.

Furthermore, in the case where the steering apparatus of the vehicle is mounted on the speed reducing mechanism through a rack assist method or a pinion assist method and the motor unit and the control apparatus are arranged at the bottom side of the vehicle under the engine room in such a way as to be exposed to the outside, external force is exerted on the motor unit and the control apparatus while the vehicle travels, due to a stone bouncing from a road surface, when the vehicle steps on a fallen object, or the like; Thus, there has been a problem that the motor unit and the control apparatus are liable to be deformed or broken.

In contrast, in the structure disclosed in Patent Document 2, the outer circumference of the control unit is covered by a resin cylindrical member and a resin guide; therefore, in the case where the electric power steering apparatus is disposed in such a way as to be exposed to the outside of the vehicle, as is the case with the foregoing case, the resin cylindrical member and the resin guide hit the motor unit and the control apparatus while the vehicle travels, due to a stone bouncing from a road surface, when the vehicle steps on a fallen object, or the like; thus, there has been a problem that the motor unit and the control apparatus are liable to be deformed or broken.

Moreover, because the outer circumference of the heat sink, is covered by the resin cylindrical member and the resin guide, the heat sink cannot effectively transfer heat to the outside and hence the heat sink needs to be upsized; thus, there has been a problem that the weight of the electric power steering apparatus increases.

The present invention has been implemented in order to solve the foregoing problems; the objective thereof is to provide an electric power steering apparatus that can be downsized and whose cost can be reduced while the heat radiation performance is secured, the strength and the vibration resistance are raised, and the mounting area of the control board is enlarged.

Means for Solving the Problems

An electric power steering apparatus according to the present invention includes a motor frame that contains a motor, a housing that contains a control circuit for controlling rotation of the motor, and a plate that abuts on the housing; rotation of the motor is transferred to a steering axle of a vehicle by way of a transfer mechanism. The electric power steering apparatus is characterized in that the motor frame, the housing, and the plate are integrally formed in such a way as to be concentric with an output axle of the motor, and in that at least one of the motor frame, the housing, and the plate is formed of magnesium or magnesium alloy.

Advantage of the Invention

An electric power steering apparatus according to the present invention includes a motor frame that contains a motor, a housing that contains a control circuit for controlling rotation of the motor, and a plate that abuts on the housing; rotation of the motor is transferred to a steering axle of a vehicle by way of a transfer mechanism. In the electric power steering apparatus, the motor frame, the housing, and the plate are integrally formed in such a way as to be concentric with an output axle of the motor, and at least one of the motor frame, the housing, and the plate is formed of magnesium or magnesium alloy; therefore, there is demonstrated an effect that downsizing and cost saving can be achieved while the heat radiation performance is secured, the strength and the vibration resistance are raised, and the mounting area of the control board is enlarged.

BEST MODE FOR CARRYING OUT THE INVENTION

Embodiment 1

Figure 1:
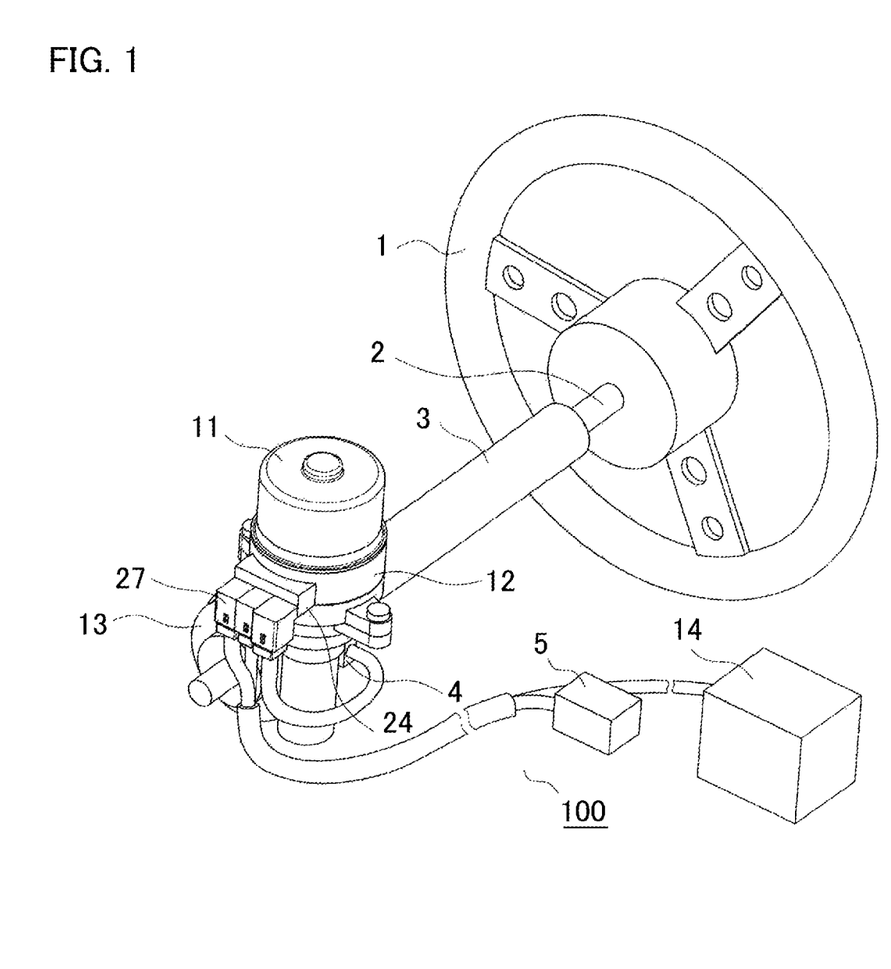
FIG. 1 is a perspective view illustrating an electric power steering apparatus according co Embodiment 1 of the present invention.

FIG. 1 is a perspective view illustrating an electric power steering apparatus according so Embodiment 1 of the present invention; FIG. 1 illustrates the configuration of an ordinary column-type electric power steering apparatus. In FIG. 1, an electric power steering apparatus 100 includes a handwheel 1 for steering a vehicle, a steering axle 2 coupled with the handwheel 1, a steering column 3 in which the steering axle 2 is pivoably mounted, a torque sensor 4 that detects steering torque of the handwheel 1, a vehicle speed sensor 5 that detects a traveling speed of the vehicle, a motor 11 that provides steering auxiliary power to the handwheel 1, a control apparatus 12 that receives respective signals from the torque sensor 4 and the vehicle speed sensor 5 and then controls the drive of the motor 11 in accordance with steering torque and the traveling condition of the vehicle, a transfer mechanism 13 that is coupled with the steering column 3 and transfers rotation of the motor 11 to the steering axle 2, and a power source unit 14 that supplies an electric current for driving the motor 11.

Figure 2:
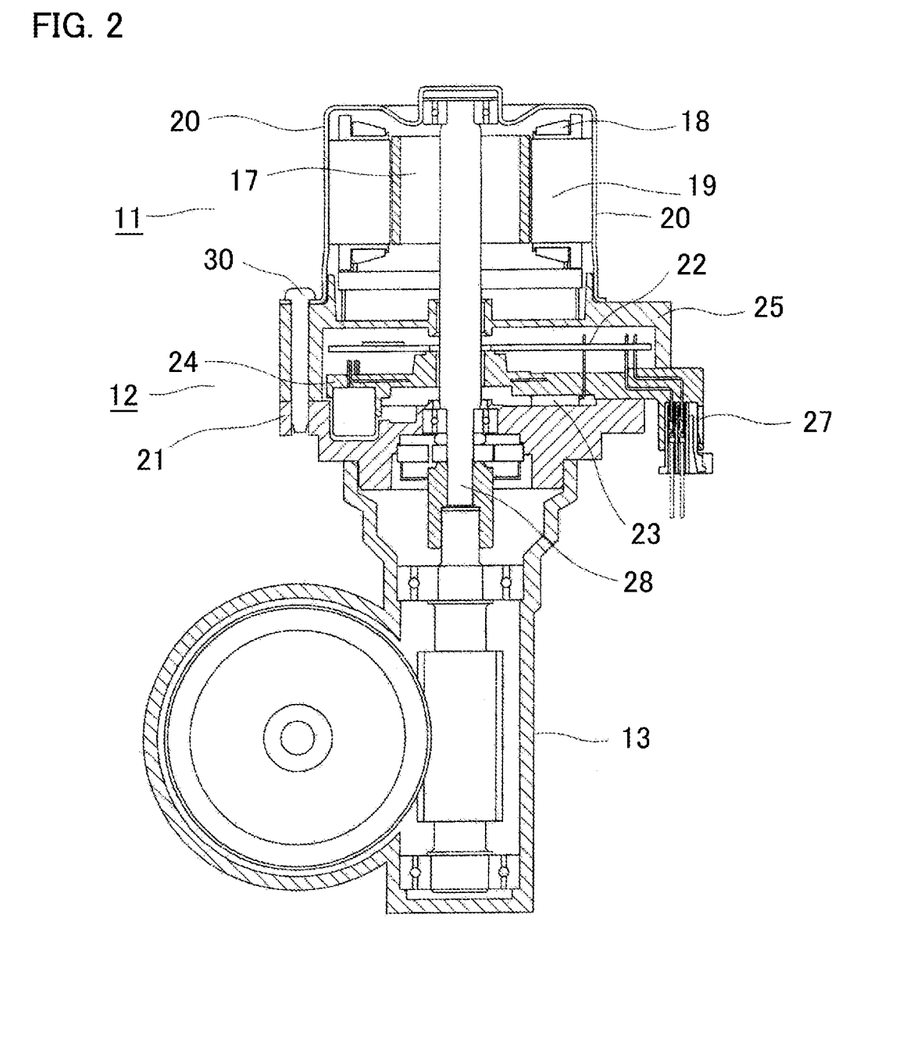
FIG. 2 is a cross-sectional view of the electric power steering apparatus according to Embodiment 1 of the present invention.

FIG. 2 is a cross-sectional view of the electric power steering apparatus according to Embodiment 1 of the present invention. As illustrated in FIG. 2, the motor 11 is formed of a three-phase brushless motor and is provided with a rotor 17, a stator 19 having an armature winding 13 of U-phase, V-phase, and W-phase, and a motor frame 20 that covers the outer circumference of the stator 19.

As illustrated in FIG. 2, the control apparatus 12 includes a control circuit 22, a power unit 23 for driving the motor 11, a frame 24 in which a plurality of conductive plates are inserted and molded, a connector 27 with which the torque sensor 4, the vehicle speed sensor 5, and the power source unit 14 are connected, a housing 25 that encloses the control circuit 22, and a metal plate 21 that abuts on the housing 25 and has a high heat conductivity.

The motor frame 20, the housing 25, and the plate 21 are integrally formed in such a way as to be concentric with an output axle 28 of the motor 11; at least one of the plate 21 and the housing 25 arranged at positions, in the vicinity of a transfer mechanism 13, that are opposite to the motor 11 is formed of magnesium or magnesium alloy.

In the electric power steering apparatus 100 configured in such a way as described above, when an unillustrated ignition switch of the vehicle is turned on electric power is supplied from the power source unit 14 to the control apparatus 12 by way of the connector 27. By way of the connector 27, information signals from the torque sensor 4 and the vehicle speed sensor 5 are inputted to an unillustrated microcomputer mounted in the control circuit 22. The microcomputer calculates a current value corresponding to steering auxiliary torque and makes the power unit 23 supply the motor 11 with a motor drive current corresponding to the calculated current value. The motor 11 outputs a required amount of auxiliary torque in a required rotation direction, in accordance with the supplied motor drive current.

The electric power steering apparatus according to Embodiment 1 is provided with the motor 11 that supplements vehicle steering operation, the motor frame 20 that contains the motor 11, the housing 25 that contains the control circuit 22 for controlling the drive of the motor 11, and the plate 21 that abuts on the housing 25; in the electric power steering apparatus 100 that provides steering auxiliary power by use of the transfer mechanism 13 for transferring the rotation of the motor 11 to the steering axle 2, the motor frame 20, the housing 25, and the plate 21 are integrally formed in such a way as to be concentric with the output axle 28 of the motor 11; at least one of the plate 21 and the housing 25 arranged at positions, in the vicinity of the forward transfer mechanism 13, that are opposite to the motor 11 is formed of magnesium or magnesium alloy.

Therefore, vibration is hardly transferred from the transfer mechanism 13 to the motor 11, because the vibration damping performance of magnesium alloy, among conventional case materials securing the heat radiation performance, is approximately more than twice as large as that of each of iron-based alloy and aluminum alloy; thus, because the stress on the motor frame is reduced, the vibration resistance can be raised while the heat radiation performance is secured.

Moreover, because at least one of the plate 21 and the housing 25 is formed of magnesium or magnesium alloy, the modulus or longitudinal elasticity is approximately 0.6 times as small as that of aluminum alloy, which is a conventional lightweight metal material, and the 0.2-percent proof stress thereof is approximately equal to that of aluminum alloy; thus, the deformation resistance/the recess resistance of magnesium or magnesium alloy under the same displacement is higher than those of conventional aluminum alloy and hence magnesium or magnesium alloy is insusceptible to the resin material in terms of deformation or cracking; therefore, even when the electric power steering apparatus 100 is mounted at the bottom portion of the vehicle in such a way as to be exposed to a road surface, the deformation resistance or the breaking strength of the apparatus can be raised while the lightening and the heat radiation performance are secured at a time when a bouncing stone or a foreign material hits the electric power steering apparatus 100 or when the vehicle steps on a fallen object.

Furthermore, the specific gravity of magnetic alloy is small and approximately equal to that of a resin material, i.e., approximately 0.7 times as high as that of aluminum alloy and approximately 0.2 times as high as that of iron-based alloy, and the heat conductivity thereof is approximately half as high as that of aluminum alloy and is approximately 1.3 times as high as that of iron-based alloy and approximately 60 times as high as that of a resin material; therefore, weight saving can be achieved while the heat radiation performance of the apparatus is secured.

Embodiment 2

Figure 3:
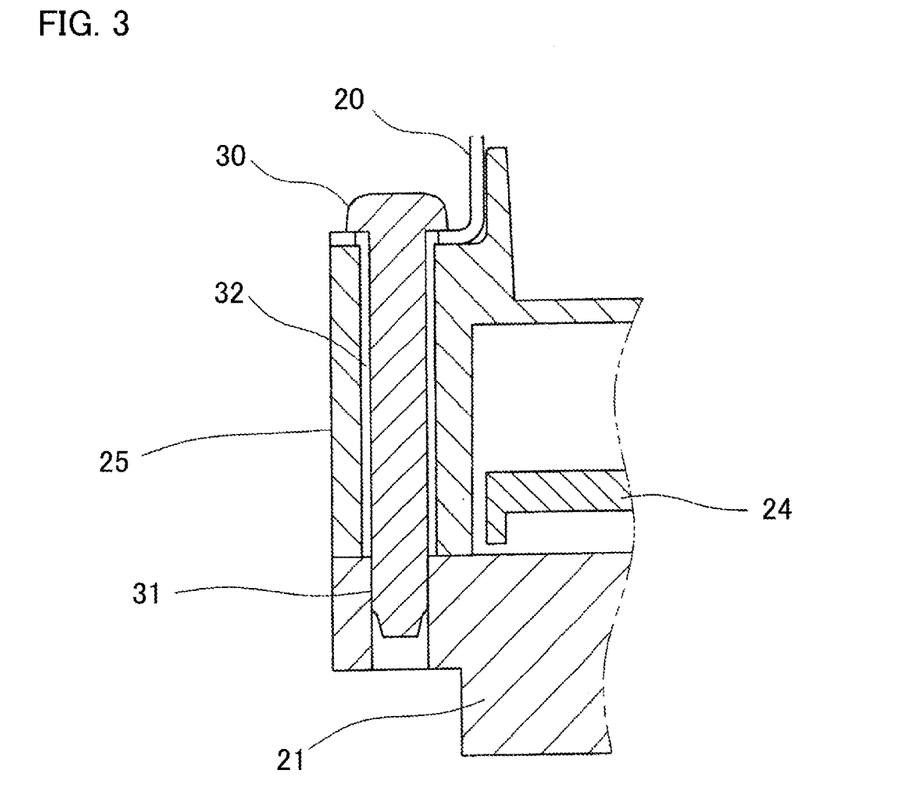
FIG. 3 is an enlarged partial cross-sectional view of a screw portion of an electric power steering apparatus according to Embodiment 2 of the present invention.

FIG. 3 is an enlarged partial cross-sectional view of a screw portion of an electric power steering apparatus according to Embodiment 2 of the present invention; FIG. 3 illustrates the configurations of the motor 11 and the control apparatus 12. In FIG. 3, the motor frame 20, the housing 25, and the plate 21 are integrally fixed to one another by the screw 30. At least one of the plate 21 and the housing 25 is formed of magnesium or magnesium alloy, and at least one member, formed of magnesium or magnesium alloy is provided with a through hole 32 for the screw 30. A female screw portion 31 is formed in the member formed of a metal material other than magnesium or magnesium alloy; the screw 30 is inserted into the through hole 32 so as to engage with the female screw portion 31 and hence screw axial force is generated, so that bonding power for gripping fixation is provided. The other configurations are the same as those in Embodiment 1.

In such a configuration as described above, in general, the tensile strength of magnesium alloy is small, i.e., approximately 0.2 times as high as that of aluminum alloy and approximately 0.5 times as high as that of iron-based alloy; thus, in the case where tightening torque is provided to the screw 30, crushing of the female screw hardly reduces screw axial force and hardly breaks the fastening in comparison with magnesium alloy; therefore, the strength and the vibration resistance of the apparatus is raised and hence an effect the same as that in Embodiment 1 can be demonstrated.

Embodiment 3

Figure 4A:
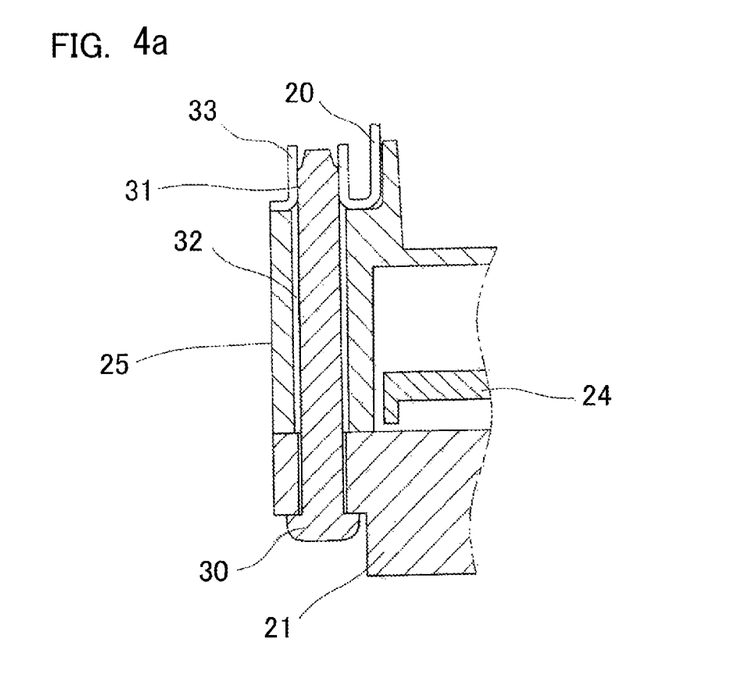
FIG. 4a is an enlarged partial cross-sectional view of a screw portion of an electric power steering apparatus according to Embodiment 3 of the present invention.

FIG. 4a is an enlarged partial cross-sectional view of a screw portion of an electric power steering apparatus according to Embodiment 3 of the present invention. In Embodiment 2, the female screw portion 31 is formed in the member formed of a metal material other than magnesium or magnesium alloy; however, in Embodiment 3 illustrated in FIG. 4a, the female screw portion 31 is formed in a burring portion 33 obtained by applying burring machining to the motor frame 20. The other configurations are the same as those in Embodiment 2. This kind of configuration can also demonstrate an effect the same as that in Embodiment 2.

Embodiment 4

Figure 4B:
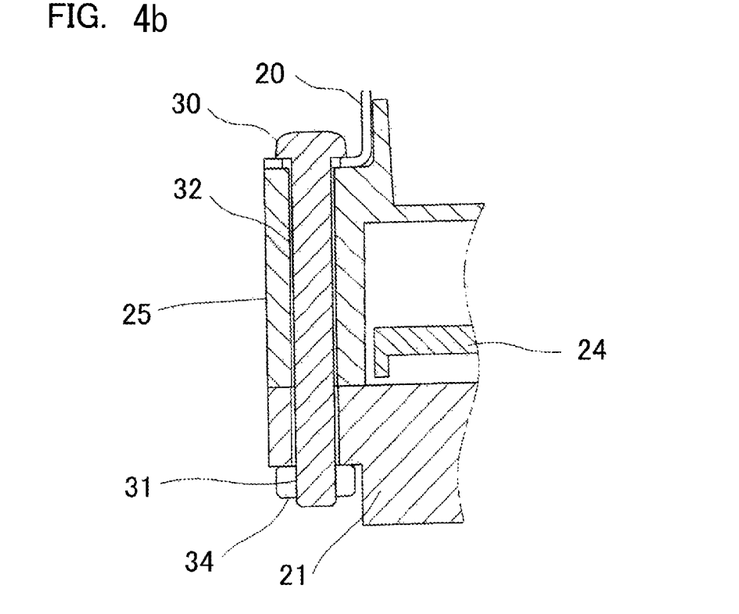
FIG. 4b is an enlarged partial cross-sectional view of a screw portion of an electric power steering apparatus according to Embodiment 4 of the present invention.

FIG. 4b is an enlarged partial cross-sectional view of a screw portion of an electric power steering apparatus according to Embodiment 4 of the present invention. In Embodiment 3, the female screw portion 31 is formed in the burring portion 33; however, in Embodiment 4 illustrated in FIG. 4b, a nut 34 in which the female screw portion 31 is formed is utilized. The other configurations are the same as those in Embodiment 2. This kind of configuration can also demonstrate an effect the same as that in Embodiment 2.

Embodiment 5

Figure 5:
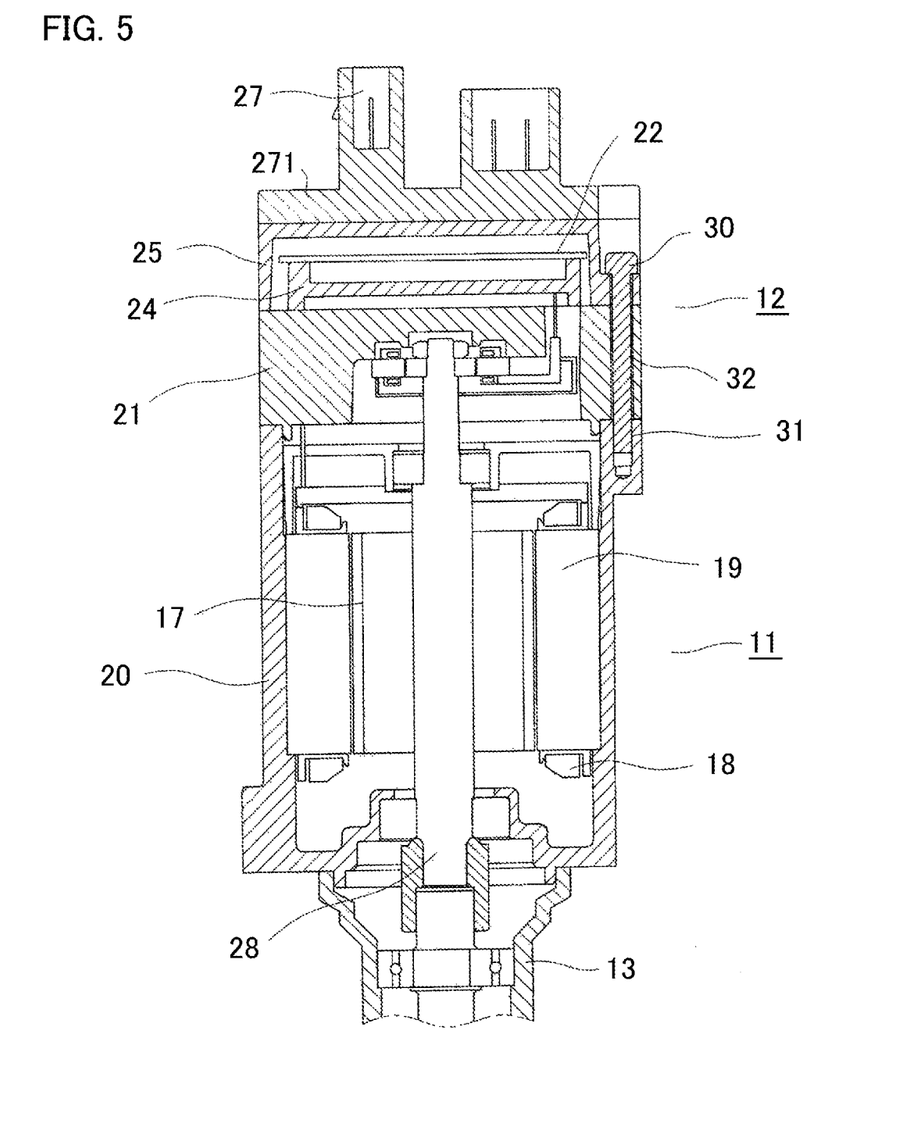
FIG. 5 is a cross-sectional view of an electric power steering apparatus according to Embodiment 5 of the present invention.

FIG. 5 is a cross-sectional view of an electric power steering apparatus according to Embodiment 5 of the present invention; the electric power steering apparatus is configured as an ordinary one; FIG. 5 illustrates the configurations of a motor and a control apparatus. In FIG. 5, the housing 25 and the plate 21 are arranged at positions opposite to the output axle 28 of the motor 11; at least one of the motor frame 20, the housing 25, and the plate 21 is formed of magnesium or magnesium alloy. The other configurations are the same as those in Embodiment 2. This kind of configuration can also demonstrate an effect the same as that in Embodiment 2.

Embodiment 6

Figure 6A:
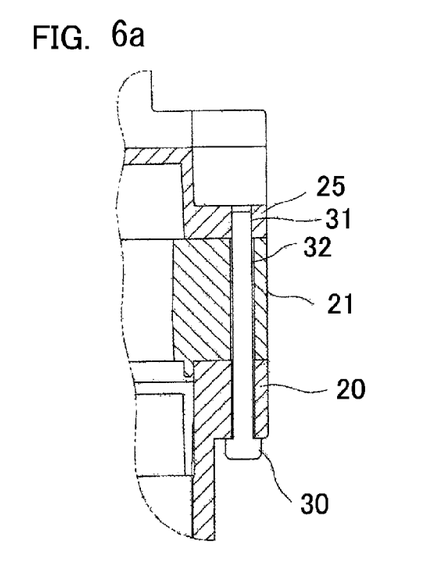
FIG. 6a is an enlarged partial cross-sectional view of a screw portion of an electric power steering apparatus according to Embodiment 6 of the present invention.

FIG. 6a is an enlarged partial cross-sectional view of a screw portion of an electric power steering apparatus according to Embodiment 6 of the present invention. In Embodiment 6, as illustrated in FIG. 6a, the female screw 31 is provided in the plate 21 at a time when in the configuration according to Embodiment 5 illustrated in FIG. 5, the motor frame 20 is formed of magnesium or magnesium alloy.

Because in the electric power steering apparatus 100 configured as described above, heat generated in the motor 11 can effectively be radiated to the outside, the heat radiation performance of the electric power steering apparatus is raised; in addition, when vibration is transferred from the transfer mechanism 13 to the motor 11, the vibration from the transfer mechanism 13 is attenuated in the motor frame 20 and hence the vibration to be transferred to the control apparatus 12 is reduced; therefore, the soldering strength of the components mounted on the control circuit 22 in the control apparatus 12 and the contact reliability of the contact portion of the connector 27 are raised.

Embodiment 7

Figure 6B:
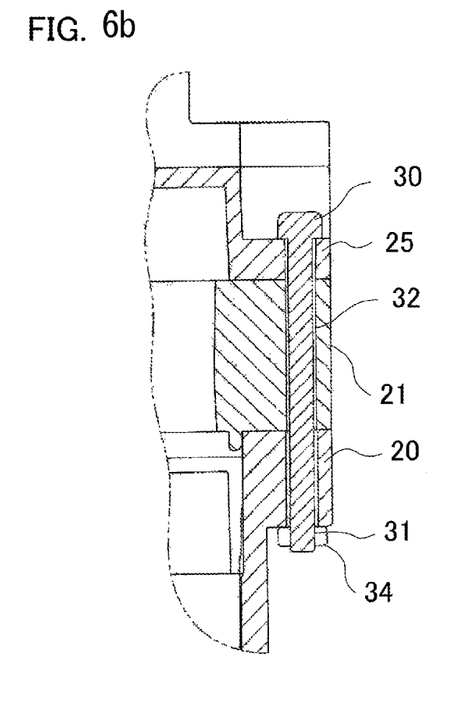
FIG. 6b is an enlarged partial cross-sectional view of a screw portion of an electric power steering apparatus according to Embodiment 7 of the present invention.

FIG. 6b is an enlarged partial cross-sectional view or a screw portion of an electric power steering apparatus according to Embodiment 7 of the present invention. In Embodiment 6, the female screw 31 is provided in the plate 21; however, in Embodiment 7, as illustrated in FIG. 6b, the nut 34 is utilized. The other configurations are the same as those in Embodiment 5. This kind of configuration can also demonstrate an effect the same as that in Embodiment 6.

Embodiment 8

Figure 7A:
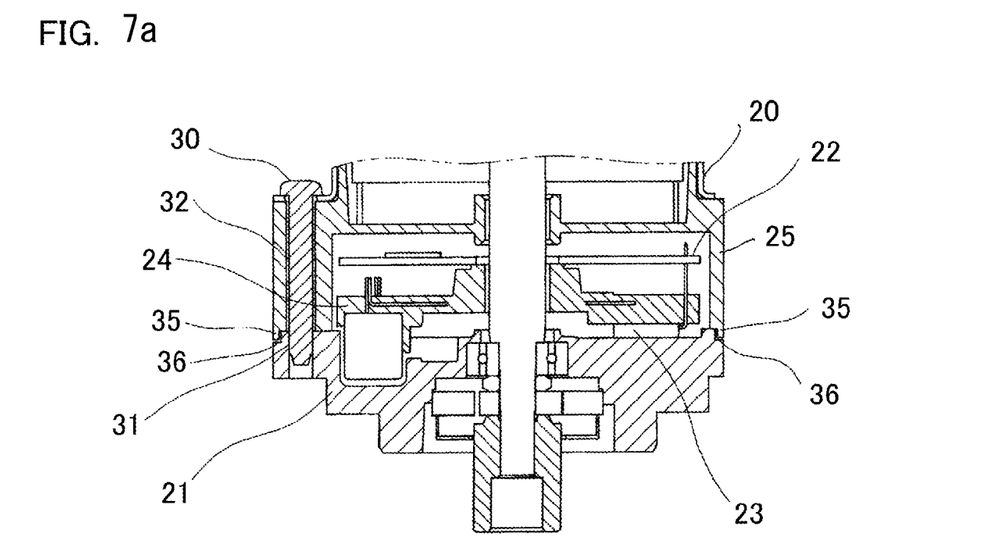
FIG. 7a is a cross-sectional view of an electric power steering apparatus according to Embodiment 8 of the present invention.

FIG. 7a is a cross-sectional view of an electric power steering apparatus according to Embodiment 8 of the present invention; the electric power steering apparatus is configured as an ordinary one; FIG. 7a illustrates the configurations of a motor and a control apparatus. In FIG. 7a, a ring-shaped rib 35 is provided on almost the whole circumference of the housing 25 formed of magnesium or magnesium alloy; an almost ring-shaped notch portion 36 is formed in she plate 21 that abuts on the rib 35; the rib 35 and the notch portion 36 face each other so as to be fixed. The other configurations are the same as those in Embodiment 2.

Magnesium alloy is superior to aluminum alloy in terms of the die-casting performance; thus, a thin-walled shape can readily be formed. Accordingly, no secondary machining is required and hence the cost can be reduced. Moreover, because foreign materials from the outside can be prevented from intruding therein, no adhesive needs to be utilized; therefore, the ease of assembly is raised and the cost can be reduced. This kind of configuration can also demonstrate an effect the same as that in Embodiment 2.

Embodiment 9

Figure 7B:
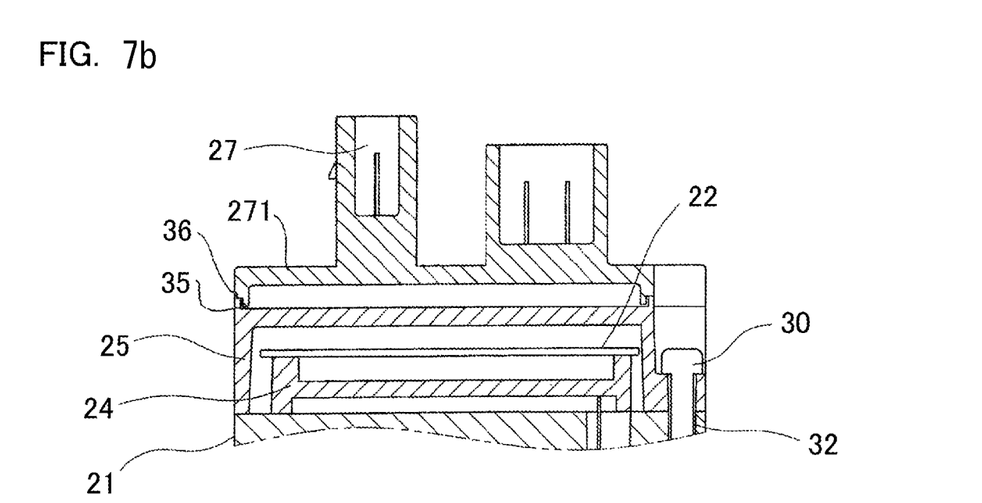
FIG. 7b is a cross-sectional view of an electric power steering apparatus according to Embodiment 9 of the present invention.

FIG. 7b is a cross-sectional view of an electric power steering apparatus according to Embodiment 9 of the present invention; the electric power steering apparatus is configured as an ordinary one; FIG. 7b illustrates the configurations of a motor and a control apparatus. In FIG. 7b, the ring-shaped rib 35 is provided on almost the whole circumference of the housing 25 formed of magnesium or magnesium alloy; the almost ring-shaped notch portion 36 is formed in a connecter supporting member 271 that abuts on the housing 25; the rib 35 and the notch portion 36 face each other so as to be fixed. The other configurations are the same as those in Embodiment 5. This kind of configuration can also demonstrate an effect the same as that in each of Embodiments 5 and 6.

Embodiment 10

In an electric power steering apparatus according to Embodiment 10 of the present invention, the housing 25 is formed of magnesium Or magnesium alloy, encloses the outer circumference of the contained control circuit 22, and is fixed in such a way as to adhere to almost the whole circumference of the motor frame 20 and/or the plate 21. The other configurations are the same as those in Embodiment 2.

In such a configuration as described above, because the housing 25 is fixed in such a way as to adhere to almost the whole circumference of the motor frame 20 and/or the plate 21, the strength, the attenuation effect, and the heat radiation performance of the electric power steering apparatus are raised and hence the thickness of the wall thereof can be reduced; therefore, because the inner volume of the housing 25 increases and hence the control circuit 22 can be upsized, the mounting area for electronic components can be enlarged while the weight saving is achieved.

In the case where the housing 25 is formed through die-cast molding, the chin-walled shape can be formed in comparison with aluminum or aluminum alloy; thus, because the machining process can be reduced and hence the cost can be decreased. This kind of configuration can also demonstrate an effect the same as that in Embodiment 2.

Embodiment 11

In an electric power steering apparatus according to Embodiment 11 of the present invention, the screw 30 is formed of a metal material having a thermal linear expansion coefficient the same as that of the member where the through hole 32 is provided. The other configurations are the same as those in Embodiment 2.

In such a configuration as described above, because the thermal linear expansion coefficient of iron-based alloy is approximately ⅓ times as large as that of magnesium alloy and approximately ½ times as large as that of aluminum alloy, the amount of thermal contraction, due to a temperature change, of each of magnesium alloy and aluminum alloy is larger than that of iron-based alloy; therefore, when as the metal material of the screw 30, magnesium, magnesium alloy, aluminum, aluminum alloy, or the like is utilized, it is made possible to prevent the deterioration of screw axial force at a low temperature and the plastic deformation, the destruction, or the like of magnesium-alloy components at a high temperature. This kind of configuration can also demonstrate an effect the same as that in Embodiment 2.

In the scope of the present invention, the embodiments thereof can freely be combined with one another and can appropriately be modified or omitted.

INDUSTRIAL APPLICABILITY

The present invention can be applied, to the field of an electric power steering apparatus or a vehicle such as an automobile that utilizes the electric power steering apparatus.

DESCRIPTION OF REFERENCE NUMERALS

1: handwheel
2: steering axle
3: steering column
4: torque sensor
5: vehicle speed sensor
11: motor
12: control apparatus
13: transfer mechanism
14: power source unit
17: rotor
18: armature winding
19: stator
20: motor frame
21: plate
22: control circuit
23: power unit
24: frame
25: housing
27: connector
271: connector supporting member
28: output axle
30: screw
31: female screw portion
32: through hole
33: burring portion
34: nut
35: rib
36: notch portion
100: electric power steering apparatus

The invention claimed is:
1. An electric power steering apparatus comprising:
a motor frame that contains a motor;
a housing that contains a control circuit for controlling rotation of the motor;
a plate that abuts on the housing; and
a control apparatus frame, at least a part of which is covered by the housing, on which the control circuit and a power unit for driving the motor are mounted, and that is provided with an electrically conductive board electrically connected to the control circuit and the power unit,
wherein rotation of the motor is transferred to a steering axle of a vehicle by way of a transfer mechanism,
wherein the plate has a wall surface that extends substantially perpendicularly to a direction in which an axle center of an output axle of the motor extends,
wherein the control apparatus frame is arranged in such a way as to face the wall surface of the plate in the direction in which the axle center extends, wherein the power unit is mounted on one surface of the control apparatus frame in such a way as to abut on the wall surface of the plate, wherein the control circuit is mounted on another surface in a front and back relationship with the one surface of the control apparatus frame, wherein the motor frame, the housing, and the plate are integrally formed in such a way as to be concentric with the output axle of the motor, and are juxtaposed in the direction in which the axle center extends, wherein at least one of the motor frame, the housing, and the plate is formed of magnesium or magnesium alloy, wherein the motor frame, the housing, and the plate are integrally fixed to one another by a screw, and wherein a through hole to be penetrated by the screw is formed in at least one, of the motor frame, the housing, and the plate, that is formed of magnesium or magnesium alloy.

2. The electric power steering apparatus according to claim 1,
wherein the housing and the plate are arranged between the motor and the transfer mechanism, and
wherein at least one of the housing and the plate is formed of magnesium or magnesium alloy.

3. The electric power steering apparatus according to claim 1,
wherein the housing and the plate are arranged at positions, in the vicinity of the motor, that are opposite to the transfer mechanism, and
wherein at least one of the motor frame, the housing, and the plate is formed of magnesium or magnesium alloy.

4. The electric power steering apparatus according to claim 1,
wherein at least one of the motor frame, the housing, and the plate that is formed of magnesium or magnesium alloy is provided with a ring-shaped rib formed over almost the whole circumference thereof,
wherein any of the motor frame, the housing, and the plate that abuts on the at least one of the motor frame, the housing, and the plate that is formed of magnesium or magnesium alloy, is provided with a notch portion formed almost in the shape of a ring, and
wherein the rib and the notch portion are fixed to each other in such a way as to face each other.

5. The electric power steering apparatus according to claim 1,
wherein the housing is formed of magnesium or magnesium alloy and encloses the outer circumference of the control circuit contained therein, and
wherein the housing is fixed to one or both of the motor frame and the plate in such a way as to adhere thereto over almost the whole circumference thereof.

6. The electric power steering apparatus according to claim 1, wherein the screw is formed of a metal material having a linear-expansion coefficient almost the same as that of said at least one in which the through hole is formed.

* * * * *